3,824,149
METHOD OF HALOGENATING AND ADHERING THERMOPLASTIC ELASTOMERIC BLOCK COPOLYMERS
James T. Harlan, Jr., Torrance, Calif., and Donald Pettit, Isham, Frederick B. Blackwell, Seagrave, and Alan R. Carter, Kettering, England, assignors to Shell Oil Company, New York, N.Y.
No Drawing. Continuation of abandoned application Ser. No. 852,483, Aug. 22, 1969. This application July 7, 1972, Ser. No. 269,657
Claims priority, application Great Britain, Aug. 22, 1968, 40,166/68
Int. Cl. A43b 9/12; B32b 27/40; C09j 5/02
U.S. Cl. 161—190                                          5 Claims

ABSTRACT OF THE DISCLOSURE

An improved method of adhering unvulcanized thermoplastic elastomeric block copolymers of monovinyl arenes and conjugated dienes with adhesives based upon polychloroprene or polyurethane comprising a preliminary surface halogenation treatment of the block copolymer.

---

This is a continuation of application Ser. No. 852,483, filed Aug. 22, 1969, and now abandoned.

Recent developments in the field of synthetic elastomers have resulted in the discovery of a novel class of materials having the stress-strain properties of a vulcanized rubber but which do not require vulcanization in order to attain these properties. These comprise block copolymers, as more fully described hereinafter, typified by the simple structure A—B—A wherein each A is a monovinyl arene polymer block, such as styrene, and B is a conjugated diene polymer block. While these materials have surprisingly outstanding elastomeric properties such as high tensile strength without the need for vulcanization, and therefore can be processed through equipment normally handling only thermoplastic materials, they possess certain limitations which it would be of material advantage to improve.

It is known that the receptiveness of thermoplastic elastomeric soling materials towards adhesives, e.g., those based upon polychloroprene and polyurethane, is often unsatisfactory. Modern methods of shoe making frequently employ stuck-on soles, as opposed to the traditional stitched-on leather sole and hence the problem of ensuring good adhesion of the sole to the upper. In view of the special requirements of flexing of the substrate and weather resistance, the problem is of considerable importance.

We have now discovered that thermoplastic elastomeric block copolymers of monovinyl arene and conjugated dienes are greatly improved in receptiveness to adhesives, particularly polychloroprene and polyurethane based adhesives, by a preliminary surface treatment of the block copolymer with a halogen. Preferred halogenation treatments are bromination and chlorination by exposure to the halogen in gaseous or liquid phase.

It is known that the suitability of vulcanized rubbers for application of certain surface coatings thereon may be improved by immersion in chlorine water. It was unexpected to find, however, that bonds stronger than the unvulcanized thermoplastic elastomers themselves could be provided without any mechanical surface treatment by polychloroprene and polyurethane adhesives after preliminary surface halogenation.

The thermoplastic elastomeric block copolymers treated in accordance with this invention will have one of two preferred configurations; namely, either linear or branched. These may be represented by the two general configurations A$(B-)_n$, representing the linear block copolymer and A—B$(B-A)_n$, representing the branched or radial type of block copolymer. In either formula the subscript $n$ represents an integer usually between 1 and 5. Whenever $n$ is an integer greater than 1, adjacent blocks B are treated as a single polymer block for purposes of average molecular weight. The most simple block copolymer species therefore will have the general configuration A—B—A, each A representing a thermoplastic block of a monovinyl arene and each B representing an elastomeric block of a conjugated diene. Thus typical block copolymers will have the following configurations:

polystyrene-polybutadiene-polystyrene
polystyrene-polyisoprene-polystyrene
poly(alpha methyl styrene)-polybutadiene-poly(alpha methyl styrene)

The block molecular weights are variable but usually will comprise those in which the blocks A each have average molecular weights between about 5,000 and 50,000 while the blocks B will have average molecular weights between about 25,000 and 500,000. The A block content may vary between from 10 to about 60% by weight, preferably from 20 to about 55% by weight of the total polymer. Mol weights may be determined by intrinsic viscosity measurements which have been correlated with primary molecular weight measurement including osmometry and radio tracer measurements of tritium terminated polymer.

The block copolymers may be prepared by processes already disclosed in the block copolymer art. The monovinyl arenes utilised in the blocks A may be styrene or alpha methyl styrene as well as mixtures thereof while the conjugated dienes may be those having from 4–8 carbon atoms per molecule including isoprene or butadiene and their mixtures.

The thermoplastic block copolymer may contain up to 150 parts by weight per 100 parts of block copolymer of added components such as fillers, including silica, clays, calcium carbonate, pigments and the like, mineral oils, antioxidants, and other polymers, for example, polystyrene or copolymers of polystyrene and conjugated diene.

It has been found that superior adhesion of the unvulcanized thermoplastic elastomer with polychloroprene or polyurethane adhesives is best obtained when the halogen modifies the surface to only a very slight depth, for example, less than about 1 millimeter being normally sufficient. Preferred halogenation treatments are bromination and chlorination suitably at temperatures between about 0° and 100° C. Halogenation can be carried out, for example, by wiping the block copolymer sole unit with a solution of bromine in carbon tetrachloride or exposure to chlorine vapor. Some bromination methods may involve the presence of irritant concentrations of bromine vapor; if, however, aqueous solutions of bromine are selected, the bromine concentration may be reduced by dissolving salts such as ammonium chloride and/or potassium bromide in the bromine solution. The halogenation may be conducted at subatmospheric, atmospheric, or super-atmospheric pressure, e.g., from 0.1 to 100 atmospheres. The chlorine or bromine may contain a major amount of an inert diluent such as for example, nitrogen, carbon dioxide, volatile hydrocarbon, carbon-tetrachloride and the like.

The invention is illustrated by the following examples. The reactants, their proportions and other specific ingredients of the formulations are presented as being typical and various modifications can be made in view of the foregoing disclosure without departing from the spirit or scope of the disclosure or of the claims. The parts hereinafter refer to parts by weight per 100 parts of block copolymer.

Example I

A thermoplastic block copolymer having the configuration polystyrene-polybutadiene-polystyrene, the block molecular weights being 14,000–57,000–14,000 respectively, is compounded into a typical shoe-soling formulation with 60 parts of polystyrene, 60 parts of mineral oil, 15 parts of clay filler and 0.6 part of dilaurylthiodipropionate (antioxidant) and injection molded to form a sheet material of 3/16" thickness. The sheet material is wiped with a 15 percent weight/volume solution of bromine in carbon tetrachloride. The unvulcanized surface treated in this manner (one-half hour after bromination) was then bonded to leather using a commercial adhesive based upon polychloroprene. A comparative bond with the same adhesive is made to an untreated sample of the block copolymer, and the bonds tested. Results are as follows:

Bond Strength lbs./in. And Nature of Bond Failure

Not Treated:
    7, adhesion to rubber failure
Brominated:
    30, mainly rubber tearing

Example II

The procedure of Example I is repeated except that another commercial adhesive based upon polyurethane is employed and the adherend was plasticised polyvinyl chloride in place of the leather.

Bond Strength lbs./in. And Nature of Bond Failure

Not Treated:
    4, adhesion to rubber failure
Brominated:
20, mainly rubber tearing

Example III

The procedure of Example II is repeated except that commercial adhesive based upon polyurethane and containing free isocyanate is employed.

Bond Strength lbs./in. And Nature of Bond Failure

Not Treated:
    4, adhesion to rubber failure
Brominated:
    64, rubber tearing

Example IV

The procedure of Example I is repeated except that the block copolymer composition is exposed to chlorine vapor at atmospheric pressure 20° C. for two hours instead of the bromination step.

Bond Strength lbs./in. And Nature of Bond Failure

Not Treated:
    7, adhesion to rubber failure
Chlorination:
    24, partial rubber tearing

Example V

Samples of the injection molded unvulcanised block copolymer composition of Example I are exposed to bromine vapors for fifteen minutes at 20° C. and bonds made up as in Example I. The treated samples have the excellent strengths in Table I.

TABLE I

| Adhesive | Adherend | Bond strength, lbs./in. and nature of bond failure |
|---|---|---|
| Polychloroprene | Leather | 27, partial rubber tear. |
| Polyurethane | Polyvinylchloride | 32, partial rubber tearing. |
| Polyurethane (containing free isocyanate). | do | 44, rubber tearing. |

Example VI

A thermoplastic block copolymer having the configuration polystyrene-polyisoprene-polystyrene, the block molecular weights being 21,000–74,000–21,000 is molded to form a sheet material of 3/16" thickness and is treated according to the procedure of Example IV. Related results are obtained.

What we claim is:

1. As an article of manufacture a footwear assembly comprising:
    (a) a first footwear component having at least as a surface an unvulcanized block copolymer comprising at least two monovinyl arene polymer blocks A having an average molecular weight between about 5,000 and 50,000 and at least one conjugated diene polymer block B having an average molecular weight between about 25,000 and 500,000, the blocks A comprising 10–60% by weight of the block copolymer, said surface being superficially halogenated with elemental bromine or chlorine;
    (b) a second footwear component;
    (c) and as an adherent bond between the two components a polyurethane adhesive composition.

2. In the manufacture of a footwear assembly according to claim 1, the steps comprising:
    (a) providing a first footwear component having a surface comprising the block copolymer, exposing the surface to halogenation with elemental halogen at a temperature between 0° C. and 100° C. for a time sufficient to superficially halogenate the surface to a depth no greater than about 1 millimeter;
    (b) and adherently bonding the first component to the second component by means of a polyurethane adhesive composition.

3. A method according to claim 1 wherein the block copolymer is polystyrene-polybutadiene-polystyrene.

4. A method according to claim 1 wherein the block copolymer is polystyrene-polyisoprene-polystyrene.

5. A method according to claim 1 wherein the block copolymer is poly(alpha methyl styrene)-polybutadiene-poly(alpha methyl styrene).

References Cited

UNITED STATES PATENTS

| | | | |
|---|---|---|---|
| 2,715,075 | 8/1955 | Wolinski | 117—47 X |
| 3,009,904 | 11/1961 | Serniuk et al. | 260—85.3 |
| 3,063,958 | 11/1962 | Perkins et al. | 260—38 |
| 3,278,960 | 10/1966 | Nardone | 12—142 F |
| 3,309,724 | 3/1967 | Sprague et al. | 12—142 F |
| 3,326,742 | 6/1967 | Shepherd | 161—227 |
| 3,364,056 | 1/1968 | Seibel | 117—46 |
| 3,458,600 | 7/1969 | Mann | 260—879 |
| 3,576,912 | 4/1971 | Winkler | 260—880 B |
| 3,424,735 | 1/1969 | Buchheister et al. | 260—93.7 |

CHARLES E. VAN HORN, Primary Examiner

R. A. DAWSON, Assistant Examiner

U.S. Cl. X.R.

12—142 F; 36—19.5; 117—47 A; 156—308, 331; 161—255, 411; 260—94.7 HA, 880 B